(12) United States Patent
Fujiwara et al.

(10) Patent No.: US 7,019,539 B2
(45) Date of Patent: Mar. 28, 2006

(54) THICKNESS DETECTING SENSOR

(75) Inventors: Toshimitsu Fujiwara, Kusatsu (JP); Hideyuki Bingo, Kyoto (JP); Masahiro Kinoshita, Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 10/843,002

(22) Filed: May 11, 2004

(65) Prior Publication Data
US 2004/0227526 A1   Nov. 18, 2004

(30) Foreign Application Priority Data
May 15, 2003   (JP)   ............................ P2003-136875

(51) Int. Cl.
*G01R 27/26* (2006.01)
(52) U.S. Cl. ........................ 324/662; 324/658; 324/661
(58) Field of Classification Search ................. 73/718, 73/724; 324/662, 679, 658, 661
See application file for complete search history.

(56) References Cited

U.S. PATENT DOCUMENTS

| 4,320,667 | A | 3/1982 | Forrester et al. |
| 5,531,434 | A | 7/1996 | Kerschner |
| 6,388,452 | B1 * | 5/2002 | Picciotto ..................... 324/663 |
| 6,553,840 | B1 * | 4/2003 | Fournier et al. ............... 73/718 |

2002/0039271 A1   4/2002   Fournier et al.

FOREIGN PATENT DOCUMENTS

WO   WO 97/22845   6/1997

OTHER PUBLICATIONS

Patent Abstracts of Japan, publication no.: 07-119344; publication date Sep. 5, 1995; 1 page.
Patent Abstracts of Japan, Publication No. 2002-149337 dated May 24, 2002, 1 page.
European Search Report issued in EPO Application No. EP 04 00 8505 dated Jul. 21, 2004, 1 page.

* cited by examiner

*Primary Examiner*—Walter Benson
(74) *Attorney, Agent, or Firm*—Osha Liang LLP

(57) ABSTRACT

A thickness detecting sensor can widely set a dynamic range for detecting the thickness of a medium, and exactly detect the thickness of the medium even when the dynamic range is widely set in this way. Therefore, the thickness detecting sensor has a fixing electrode and a movable electrode arranged so as to be opposed to each other, a plunger for changing the gap between the electrodes by coming in contact with the medium, and a CR oscillating circuit and an FV converting circuit for converting electrostatic capacity stored between the electrodes into an electric signal for detecting the thickness of the medium. The rear end portion of the plunger comes in contact with the electrode face of the gap side of the movable electrode. The movable electrode is displaced in the direction separated from the fixing electrode correspondingly to the thickness of the medium.

16 Claims, 9 Drawing Sheets

CHANGE DUE TO PRESSING
AND CHANGE IN ENVIRONMENT

CHANGE DUE TO CHANGE
IN ENVIRONMENT

THICKNESS DETECTING SENSOR

BACKGROUND OF THE INVENTION

1. Field of the Invention

The present invention relates to a thickness detecting sensor for detecting the thickness of a medium of a thin paper sheet shape such as a sheet of paper for a copy, an OHP film, a banknote, etc., and more concretely relates to a thickness detecting sensor able to detect the thickness of the medium correspondingly to electrostatic capacity stored between electrodes by changing the gap between these electrodes correspondingly to the thickness of the medium.

2. Description of the Related Art

The thickness detecting sensor for detecting the thickness of the medium is arranged in a copying machine, etc. in recent years. This thickness detecting sensor generally detects whether paper sheets sequentially sent out of a cartridge, etc. are overlapped or not. When the thickness detecting sensor detects a predetermined thickness or more, the thickness detecting sensor judges that it is the overlap sending, and stops the conveyance, etc. With respect to a sensor for detecting a contact state of the medium by coming in contact with this medium, a sensor disclosed in patent literature 1 is known.

[Patent Literature 1]
JP-A-5-288619

This sensor is constructed by arranging a fixing electrode arranged in a base film and a movable electrode arranged so as to be opposed to this fixing electrode. The movable electrode is displaced onto the fixing electrode side by making the medium come in contact with a member arranged on the movable electrode side. The contact state with the medium is detected on the basis of a change in electrostatic capacity caused by changing the gap between these electrodes.

When the electrostatic capacity stored between the electrodes is detected, this electrostatic capacity is converted into a frequency signal by a CR oscillating circuit, etc., and this frequency is detected. However, with respect to the relation of this frequency and the gap between these electrodes, it is known that the relation as shown in FIG. 10 is formed. Namely, in a small area of the gap between the electrodes, the frequency is linearly changed correspondingly to an increase in the gap. In a large area of the gap between the electrodes, the frequency is only gradually changed even when the gap is increased. Therefore, when the gap is widely set in advance, there is a possibility that no frequency is linearly changed even when the gap is changed. Therefore, it is difficult to exactly detect the change in frequency. On the other hand, when the gap is narrowly set in advance, the frequency is linearly changed correspondingly to the change in the gap. Therefore, it is possible to exactly detect the change in frequency. However, when the gap is narrowly set in this way, the movable electrode can be displaced on the fixing electrode side only within the gap range. Therefore, when the medium having a thickness exceeding this gap range comes in contact with the sensor, this sensor is broken. Further, a dynamic range of the sensor is limited to the range of the gap between the electrodes so that the dynamic range is also reduced.

SUMMARY OF THE INVENTION

Therefore, the present invention is made by noticing such problems, and its object is to provide a thickness detecting sensor able to largely set the dynamic range and exactly detect the thickness of the medium even when the dynamic range is largely set in this way.

Namely, to solve the above problems, the thickness detecting sensor of the present invention comprises a pair of electrodes arranged so as to be opposed to each other, a plunger for changing the gap between the electrodes by coming in contact with a medium, and a converting circuit for converting electrostatic capacity stored between the electrodes into an electric signal, wherein the thickness detecting sensor is constructed such that the gap between the electrodes is enlarged by displacement of the plunger corresponding to an increase in the thickness of the medium.

In accordance with such a construction, the electrodes oppositely arranged in the initial state (a state in which no medium comes in contact with the plunger) can approximately come in close contact with each other. Accordingly, even when the gap between the electrodes is enlarged by coming in contact with the medium, its frequency can be detected within an area in which the frequency is linearly changed. Further, since the electrodes are displaced in the widening direction of the gap, there is no case in which the dynamic range is determined by the gap set in the initial state as in the conventional case. Thus, the dynamic range can be widely secured as much as possible.

Further, in another embodiment mode, one of the electrodes is set to a fixing electrode and a variable electrode for changing the gap by coming in contact with the medium and a fixing electrode for maintaining the gap are arranged on the side opposed to this set fixing electrode.

The electrostatic capacity stored between the electrodes is normally changed by the temperature of the external air, a moisture containing amount, etc. Therefore, the electrostatic capacity is changed by influences such as the temperature of the external air, the moisture containing amount, etc. Accordingly, there is a possibility that an incorrect detecting result is outputted. Therefore, the fixing electrode is arranged and the movable electrode and another fixing electrode are arranged on the side opposed to the fixing electrode. The frequencies are calculated on the basis of the electrostatic capacity stored onto this movable electrode side and the electrostatic capacity stored between both the fixing electrodes. The influences such as temperature, etc. are canceled by calculating the difference between these frequencies.

Further, in a preferable embodiment mode of the present invention, the thickness detecting sensor comprises a fixing electrode arranged so as to fix the relative position to a medium conveying path, a movable electrode arranged so as to be opposed to this fixing electrode, a spring portion for displacing the movable electrode so as to change the gap between the fixing electrode and the movable electrode, a converting circuit for converting electrostatic capacity stored between the fixing electrode and the movable electrode into an electric signal, and a plunger advanced and retreated in the axial direction by coming in contact with a medium, wherein the thickness detecting sensor is constructed such that the plunger is attached so as to be advanced and retreated by arranging a plunger insertion hole in the fixing electrode and the gap is enlarged by pressing the electrode face of the gap side in the movable electrode by this plunger.

In accordance with such a construction, since the movable electrode is pressed from the inside of the gap, the gap can be reliably enlarged by the simple construction.

Further, in another embodiment mode, one fixing electrode constituting the pair of electrodes is constructed by a printed board.

In accordance with such a construction, the fixing electrode, a line path, a terminal, etc. can be simultaneously printed, and the fixing electrode, etc. can be simply made.

In addition, a resist is arranged on the fixing electrode made by this printed board, and the gap between the opposed electrodes is formed by this resist.

In accordance with such a construction, it is not necessary to separately newly arrange a dielectric between the electrodes. Thus, in addition to the original function of the resist, this resist can be also used as the dielectric.

Further, a head portion having a diameter larger than that of the tip portion of the plunger is arranged in the rear end portion of the plunger.

In accordance with such a construction, when a through hole is formed in a case, etc. and its plunger is held, the through hole can be blocked by its head portion and the invasion of dust from the exterior can be prevented.

Further, the tip portion and the rear end portion of the plunger are constructed in the shape of a spherical surface.

In accordance with such a construction, even when the plunger is inclined by coming in contact with the medium, etc., its both end portions are formed in the spherical surface shape so that no distance between the tip portion and the rear end portion of the plunger in its longitudinal direction is changed. Therefore, even when the rear end portion of the plunger comes in contact with the electrode face of the gap side of the movable electrode and the movable electrode is displaced, no displacing amount of the movable electrode due to the inclination of the plunger is influenced.

DESCRIPTION OF THE PREFERRED EMBODIMENTS

Figure 1:
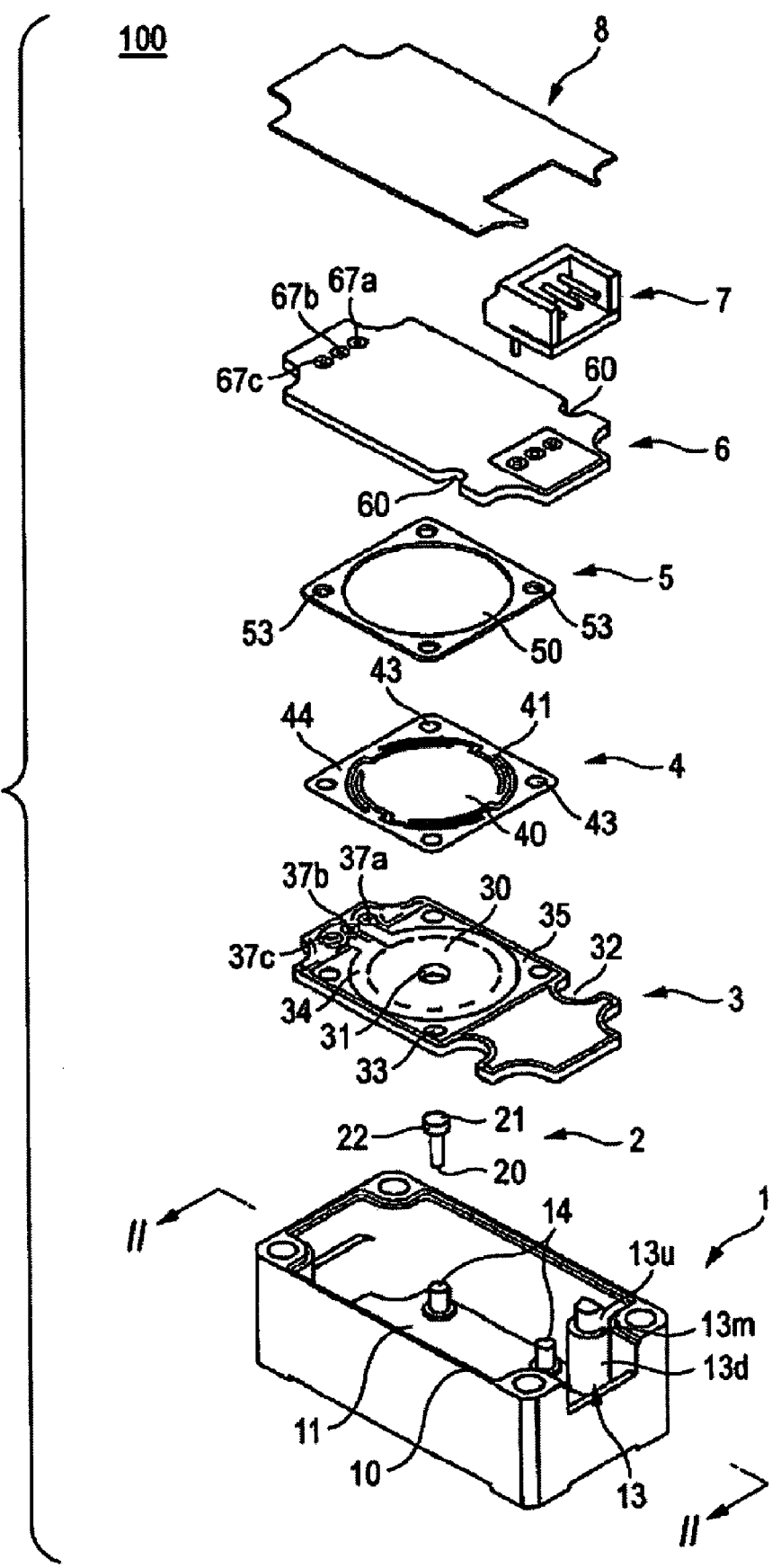
FIG. 1 is an exploded perspective view of a thickness detecting sensor in one embodiment mode of the present invention.
Figure 2:
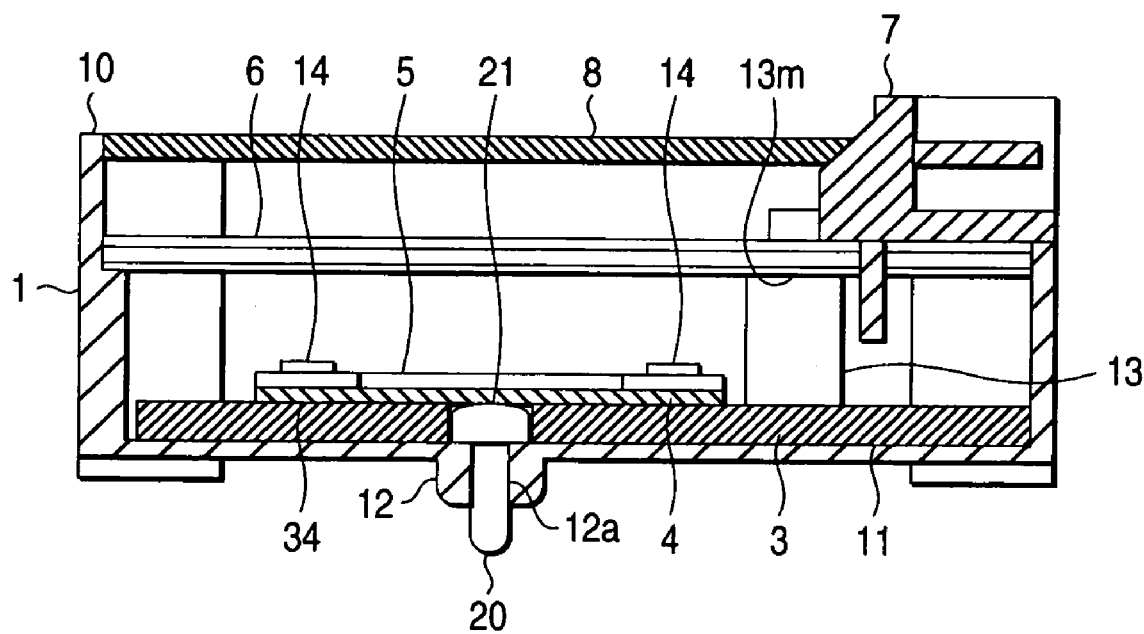
FIG. 2 is an A—A cross-sectional view of FIG. 1 in a state in which the thickness detecting sensor in this embodiment mode is assembled.
Figure 3:
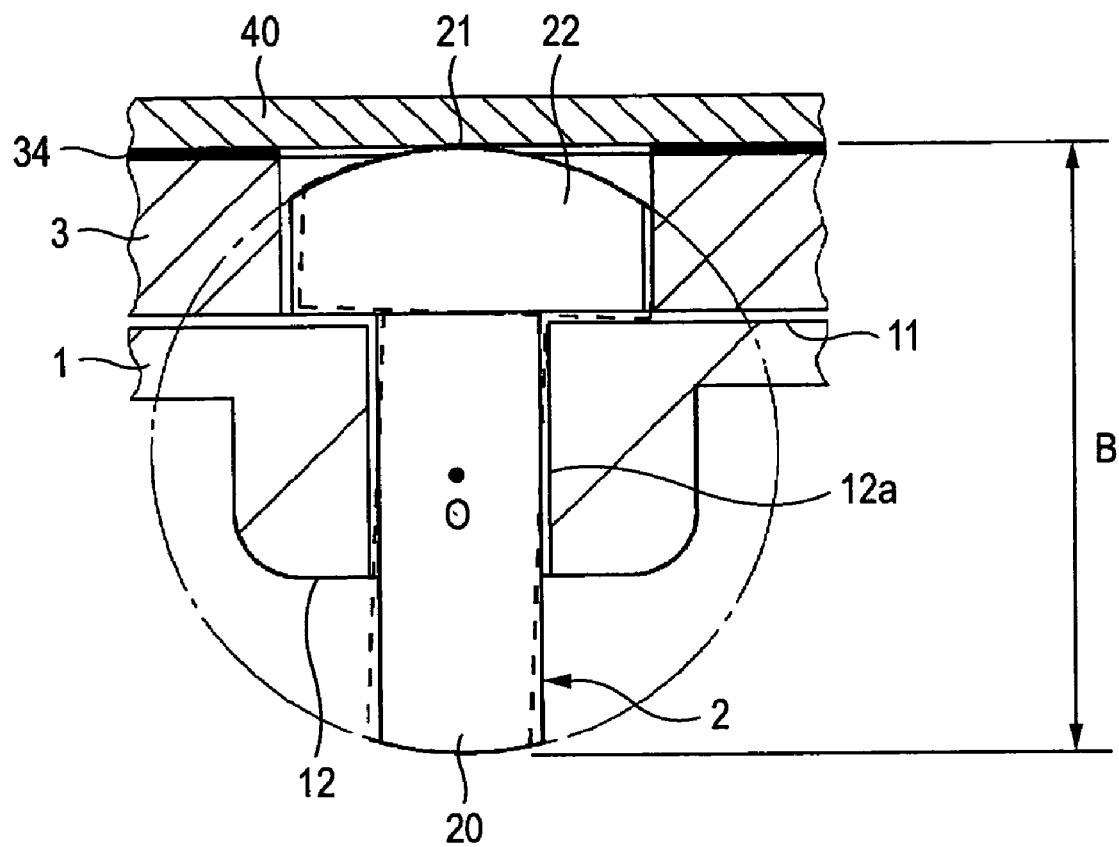
FIG. 3 is an enlarged view near a plunger in this embodiment mode.
Figure 4:
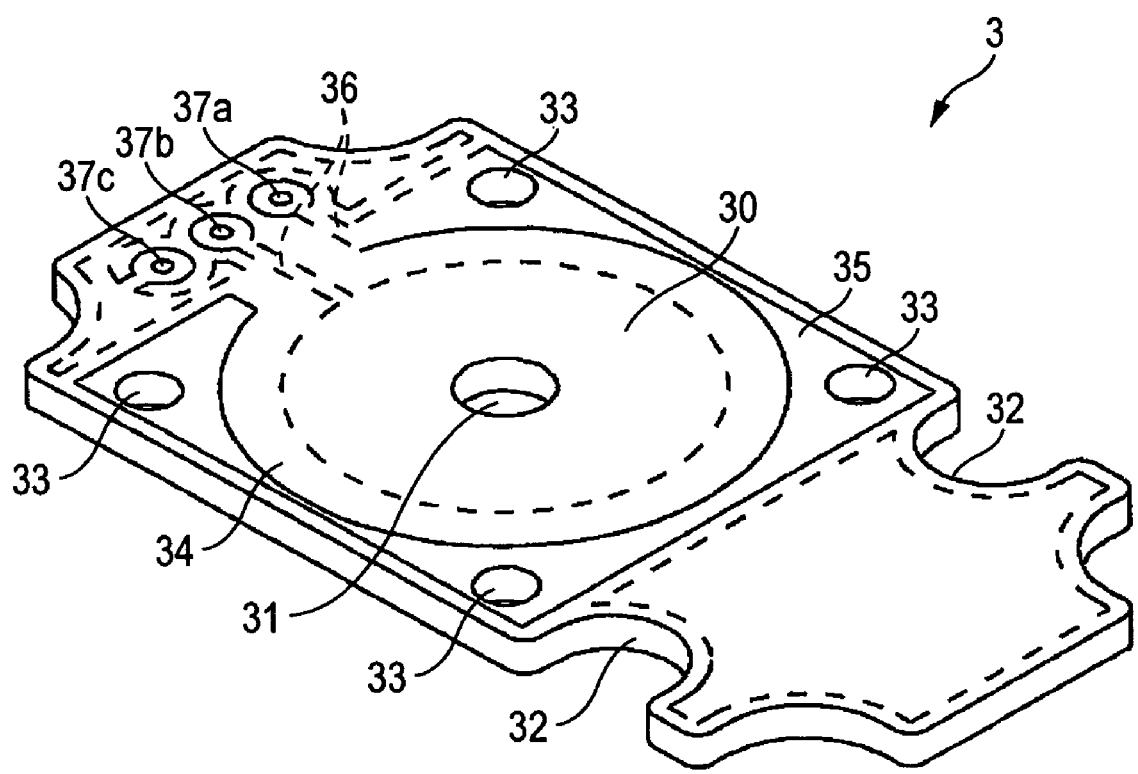
FIG. 4 is a perspective view of the external appearance of a fixing electrode plate in this embodiment mode.
Figure 5:
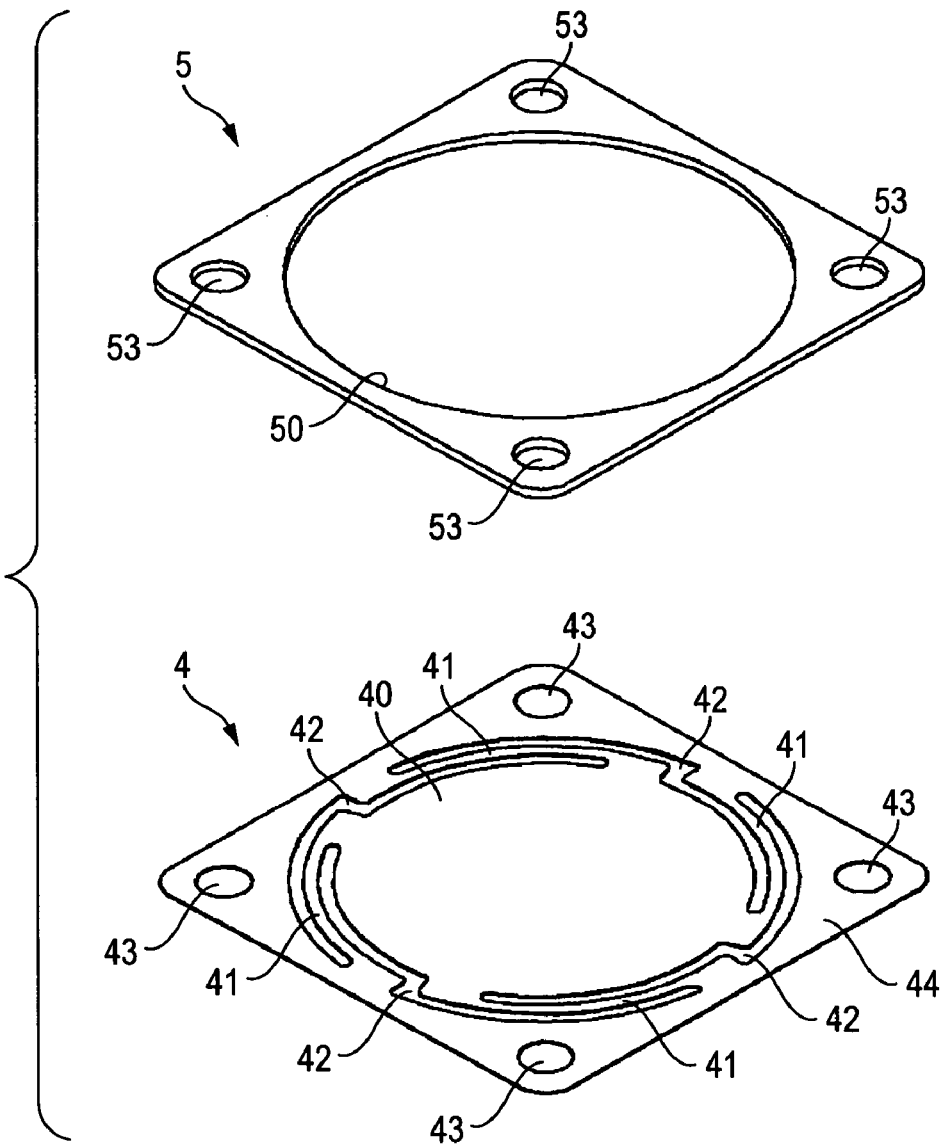
FIG. 5 is a perspective view of the external appearances of a movable electrode plate and an electrode pressing plate in this embodiment mode.
Figure 6:
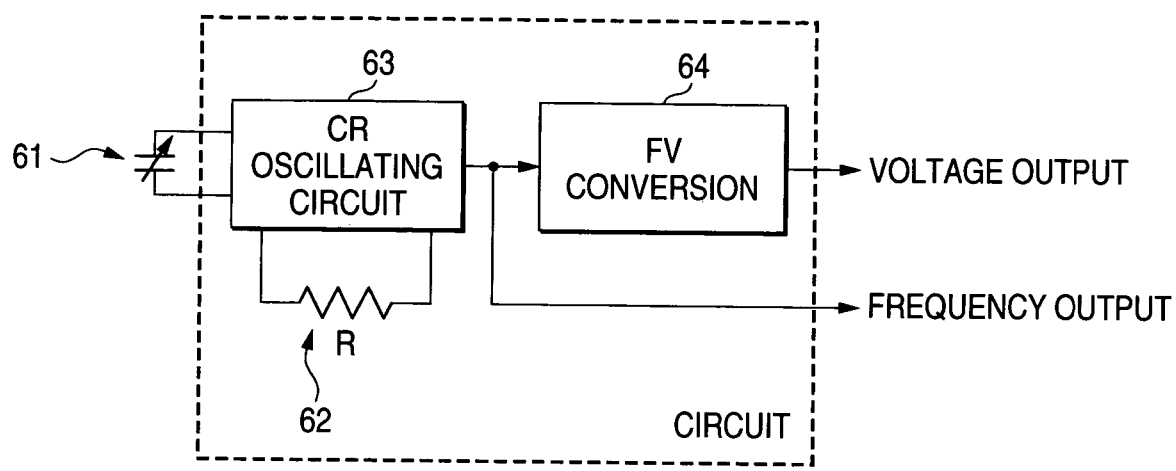
FIG. 6 is a view showing a converting circuit arranged in a circuit substrate in this embodiment mode.

The construction of a thickness detecting sensor 100 in a first embodiment mode of the present invention will next be explained with reference to the drawings. In this embodiment mode, FIG. 1 shows an exploded perspective view of the thickness detecting sensor 100. FIG. 2 shows an A—A cross-sectional view of FIG. 1 in a state in which the thickness detecting sensor 100 is assembled. FIG. 3 shows an enlarged view near a plunger 2 attached to a case 1. FIG. 4 shows an enlarged perspective view of a fixing electrode plate 3. FIG. 5 shows an enlarged perspective view of a movable electrode plate 4 and an electrode pressing plate 5. FIG. 6 shows the construction of a converting circuit arranged in a circuit substrate 6.

Figure 11:
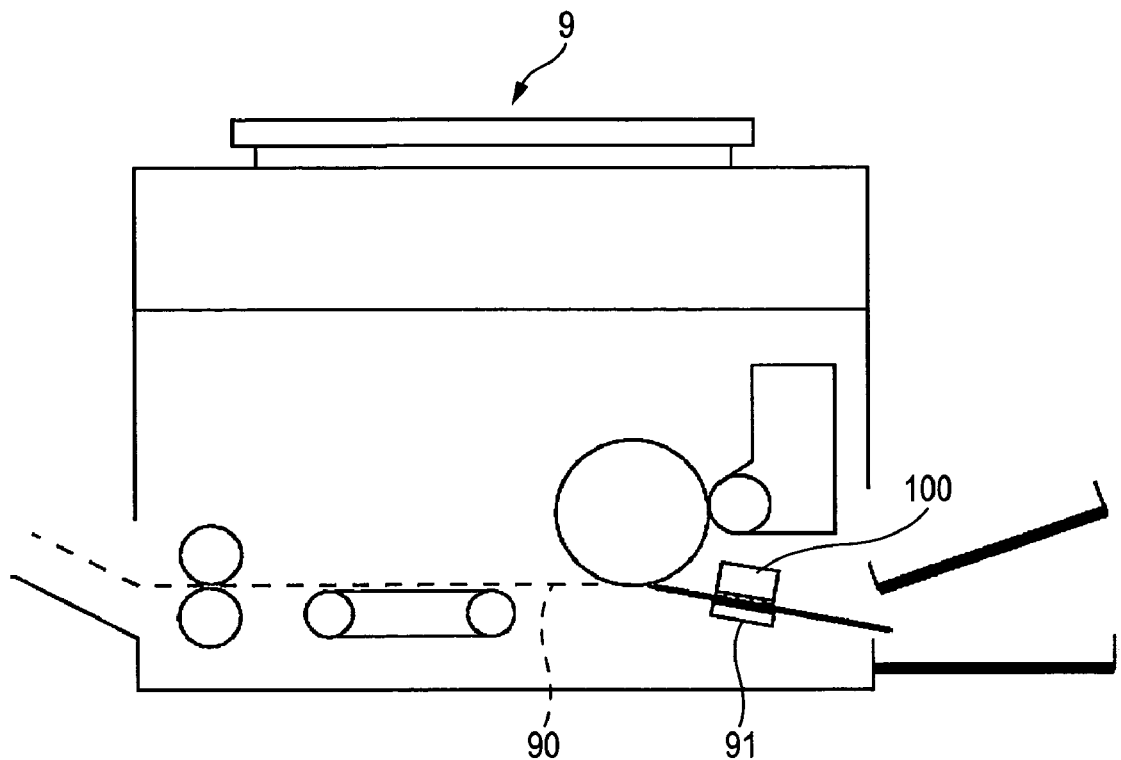
FIG. 11 is a view showing a using state of the thickness detecting sensor of the present invention.

As shown in FIG. 11, the thickness detecting sensor 100 in this embodiment mode is arranged near a medium conveying path 90 of a paper sheet kind processor 9 such as a copying machine, etc., and is arranged so as to be opposed to a guide plate 91, etc. As shown in FIG. 1, in this thickness detecting sensor 100, a fixing electrode 30, a movable electrode 40 and the circuit substrate 6 are arranged within the case main body constructed by the case 1 and a shield plate 8. The fixing electrode 30 is arranged so as to fix the relative position to the medium conveying path 90. The movable electrode 40 is arranged so as to change the gap between the movable electrode 40 and this fixing electrode 30. The circuit substrate 6 has the converting circuit for converting electrostatic capacity stored between the fixing electrode 30 and the movable electrode 40 into an electric signal. Further, the plunger 2 advanced and retreated in the axial direction by coming in contact with a medium is arranged in the thickness detecting sensor 100. A plunger insertion hole 31 is arranged at the center of the fixing electrode 30 and the plunger 2 is attached so as to be advanced and retreated. The rear end portion 21 of the plunger 2 comes in contact with the electrode face on the gap side in the movable electrode 40. Thus, when the medium comes in contact with the plunger 2, the gap between the movable electrode 40 and the fixing electrode 30 is enlarged. The construction of this thickness detecting sensor 100 will next be explained in detail.

A hemispherical projecting portion 12 (see FIGS. 2 and 3) for projecting the tip portion 20 of the plunger 2 is arranged in the case 1. A through hole 12a extended through the inside of the case 1 is arranged in the central portion of this projecting portion 12 and the plunger 2 is held so as to be advanced and retreated.

FIG. 3 shows an enlarged cross-sectional view of this plunger 2 and the case 1 near this plunger 2. This plunger 2 is formed in a columnar shape by resin. When a contact portion of the plunger 2 with the medium is set to the tip portion 20 and a contact portion of the plunger 2 with the movable electrode 40 is set to the rear end portion 21, a head portion 22 larger in diameter than the tip portion 20 side and the through hole 12a of the case 1 is arranged on the rear end portion 21 side. This head portion 22 is abutted on a bottom face portion 11 inside the case 1. Thus, it is prevented that the plunger 2 is pulled and drops from the through hole 12a. Further, the clearance of the through hole 12a is covered with the head portion 22 so as to prevent the invasion of dust, etc. from the exterior. The tip portion 20 and the rear end portion 21 of this plunger 2 are formed so as to construct the spherical surface of the same circle with the center of the plunger 2 in its longitudinal direction as a central point O. When this plunger 2 comes in contact with the medium, the plunger 2 is normally inclined by the clearance of the through hole 12a and the plunger 2 as shown by the broken line of FIG. 3. However, when the tip portion 20 and the rear end portion 21 are formed on the spherical surface of the same circle in this way, the vertical distance B between the tip portion 20 and the rear end portion 21 of the plunger 2 is not changed so much even when the plunger 2 is inclined. Therefore, the displacement of the movable electrode 40 based on the inclination of the plunger 2 can be prevented as much as possible.

On the other hand, as shown in FIGS. 1 and 2, a guide 13 for guiding the attachment of the fixing electrode plate 3 and the circuit substrate 6, the fixing electrode plate 3 having the fixing electrode 30, the movable electrode plate 4 having the movable electrode 40, and a pin 14 for fixing the electrode pressing plate 5 are arranged inside this case 1.

The guide 13 is constructed by projecting the inside wall face of the case 1 toward the inside in a longitudinal shape. A first guide 13d having a large thickness size is arranged on the bottom face portion 11 side of the case 1. Further, a step difference portion 13m is arranged in the upper portion of the first guide 13d. Further, a second guide 13u having a thickness size smaller than that of the first guide 13d is arranged on the side of an opening portion 10 from this step difference portion 13m. A concave portion 32 corresponding to this first guide 13d is arranged in the fixing electrode plate 3. This fixing electrode plate 3 is attached along this first guide 13d. Further, a concave portion 60 corresponding to the second guide 13u is also arranged in the circuit substrate 6. This circuit substrate 6 is placed and attached onto the step difference portion 13m along the second guide 13u. Further, the pin 14 is arranged so as to rise from the bottom face portion 11 of the case 1. In accordance with this, hole portions 33, 43, 53 corresponding to this pin 14 are arranged in the fixing electrode plate 3, the movable electrode plate 4 and the electrode pressing plate 5. The pin 14 is inserted into the fixing electrode plate 3, the movable electrode plate 4 and the electrode pressing plate 5, and the upper end portion of this pin 14 is deformed by heat, etc. and is fixed.

Next, the construction of the fixing electrode plate 3 is shown in FIG. 4, etc. The fixing electrode plate 3 is constructed by a printed board. In the fixing electrode plate 3, the circular fixing electrode 30 arranged at the center, a resist 34 as an insulator, and a joining portion 35 for exposing a conductor to the surface are arranged. This fixing electrode 30 is covered with the resist 34 and functions as a dielectric between the fixing electrode 30 and the movable electrode 40. On the other hand, the joining portion 35 is an outer circumferential portion of the fixing electrode 30 and is arranged on the upper face of the resist 34. The joining portion 35 is then electrically connected to the movable electrode plate 4 closely attached to this fixing electrode plate 3. The fixing electrode 30 and the joining portion 35 are connected to terminals 37a, 37b, 37c through a line path 36, and are connected to terminals 67a, 67b, 67c (FIG. 1) of the circuit substrate 6 through an unillustrated lead wire, etc. A member shown by a broken line in FIG. 4 is located on the lower side of the resist 34, and only the joining portion 35 and the terminals 37a, 37b, 37c are exposed to the upper face of the resist 34. The plunger insertion hole 31 for inserting the plunger 2 is arranged in the central portion of this fixing electrode plate 3. This plunger insertion hole 31 has a diameter slightly larger than that of the head portion 22 of the plunger 2, and the plunger 2 is held by the through hole 12a arranged in the case 1 and this plunger insertion hole 31 such that the plunger 2 can be advanced and retreated.

FIG. 5 shows the construction of the movable electrode plate 4. The movable electrode plate 4 is constructed by a thin metallic plate of a square shape, and the circular movable electrode 40 is arranged on the central side of a spring portion 41 of a linear shape. This spring portion 41 is constructed by a member left between plural slits 42 arranged in the movable electrode plate 4. In this embodiment mode, plural slits 42 of a crank shape are arranged on the concentric circle, and the spring portion 41 is constructed by the member left between these slits 42. The movable electrode 40 is twisted and displaced by flexing this spring portion 41 while maintaining a plane state. This movable electrode 40 is arranged in the position opposed to the fixing electrode 30 in the attaching state of the movable electrode plate 4. An outer circumferential portion 44 pressed by the electrode pressing plate 5 is arranged outside this movable electrode 40.

This electrode pressing plate 5 is constructed by a metallic plate of a square shape having the same outer shape size as the movable electrode plate 4, and has a circular window portion 50 for allowing the displacement of the movable electrode 40. This electrode pressing plate 5 is similarly attached to the pin 14 rising from the bottom face portion 11 of the case 1. While the electrode pressing plate 5 allows the displacement of the movable electrode 40 within the window portion 50, the electrode pressing plate 5 presses the outer circumferential portion 44 of the movable electrode plate 4 so that the joining portion 35 of the fixing electrode plate 3 and the outer circumferential portion 44 of the movable electrode plate 4 come in contact with a conductor.

As shown in FIG. 1, the terminals 67a, 67b, 67c connected to the terminals 37a, 37b, 37c of the fixing electrode plate 3 by an unillustrated lead wire, and a converting circuit for converting electrostatic capacity stored between the fixing electrode 30 and the movable electrode 40 into an electric signal are arranged in the circuit substrate 6. The construction of this converting circuit is shown in FIG. 6.

In FIG. 6, reference numeral 61 designates a variable capacitor constructed by the fixing electrode 30 and the movable electrode 40. Reference numerals 62 and 63 respectively designate a resistance element and a CR oscillating circuit. Further, reference numeral 64 designates an FV converting circuit for converting the electrostatic capacity into the electric signal. The circuit shown by the broken line in this FIG. 6 is arranged in the circuit substrate 6. The electrostatic capacity stored between the fixing electrode 30 and the movable electrode 40 by this circuit is converted into a frequency signal by the CR oscillating circuit 63, or is converted into a voltage by the FV converting circuit 64. These frequency signal and voltage are suitably selected and outputted in accordance with applications.

A connector 7 (FIG. 1) outputs the electric signal such as these frequency signal and voltage, etc., and is fixed and attached to the circuit substrate 6. Thus, conveyance control of the medium, etc. based on this electric signal are performed by the paper sheet kind processor 9 such as a copying machine, etc.

The operating principle of the thickness detecting sensor 100 constructed in this way will next be explained.

Figure 10:
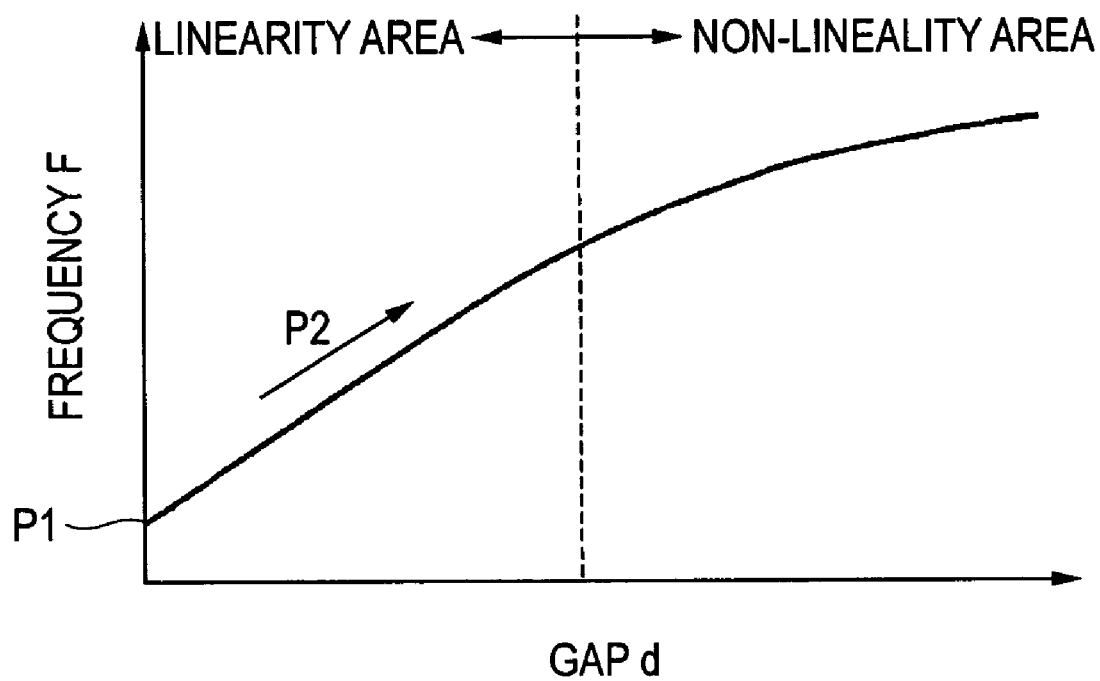
FIG. 10 is a view showing the relation of frequency and the gap between the electrodes.

First, in a state in which no medium exists, the movable electrode 40 comes in close contact with the resist 34 of the fixing electrode plate 3 by the elastic force of the spring portion 41 arranged in the outer circumferential portion of the movable electrode 40. Since the resist 34 has a thin thickness of about several μm (about 20 μm), the frequency outputted by the CR oscillating circuit 63 shows a minimum value in this state as shown by point P1 of FIG. 10. When the conveyed medium comes in contact with the plunger 2 and pushes up the plunger 2 by its increasing thickness amount, the central portion of the movable electrode 40 is pushed up by the rear end portion 21 of this plunger 2 and the gap between the movable electrode 40 and the fixing electrode 30 is changed so as to be enlarged. At this time, the frequency outputted by the CR oscillating circuit 63 is gradually increased as shown by the arrow P2 of FIG. 10. However, in this embodiment mode, the fixing electrode 30 and the movable electrode 40 come in close contact with each other through the resist 34 in the initial state. Therefore, the frequency is linearly changed even when the gap is enlarged from this close contact. Thus, the change in the thickness of the medium can be exactly detected by detecting this frequency.

Thus, in the above embodiment mode, the thickness detecting sensor has the fixing electrode 30 and the movable electrode 40 arranged so as to be opposed to each other, the plunger 2 for changing the gap between the electrodes by coming in contact with the medium, and the CR oscillating circuit 63 and the FV converting circuit 64 for converting the electrostatic capacity stored between the electrodes into the electric signal for detecting the thickness of the medium. The thickness detecting sensor is constructed such that the rear end portion 21 of the plunger 2 comes in contact with the electrode face of the gap side of the movable electrode 40, and the movable electrode 40 is displaced in the direction separated from the fixing electrode 30 correspondingly to the increase in the thickness of the medium. Accordingly, the frequency can be detected within an area in which this frequency is linearly changed. Thus, the thickness of the medium can be exactly detected. Further, since the movable electrode 40 is displaced in the direction separated from the fixing electrode 30, no dynamic range is limited by the gap set in the initial state and the dynamic range can be widely secured.

Further, in this embodiment mode, since the fixing electrode plate 3 is formed by a printed board, the terminals 37*a*, 37*b*, 37*c* and the line path 36 can be formed simultaneously with the fixing electrode 30 so that the fixing electrode, etc. can be simply made.

Further, the resist 34 is arranged on the fixing electrode 30 and the movable electrode 40 comes in close contact with the upper face of this resist 34. Accordingly, this resist 34 can be used as an original insulation protecting material, and can be also used as a dielectric. Accordingly, it is not necessary to separately newly arrange the dielectric between the electrodes.

In addition, the shapes of the tip portion 20 and the rear end portion 21 of the plunger 2 are constructed in a spherical surface shape. Even when the plunger 2 is inclined by coming in contact with the medium, no vertical distance between the tip portion 20 and the rear end portion 21 of this plunger 2 is changed so much. Accordingly, the thickness detecting sensor reduces that a displacement error due to this inclination is applied to the movable electrode 40.

The present invention is not limited to the above embodiment mode, but can be embodied in various modes.

For example, when the error of the electrostatic capacity due to temperature characteristics, etc. is removed, a pair of electrodes for invariably setting the gap between the electrodes may be also arranged in addition to the above embodiment mode.

Figure 7:
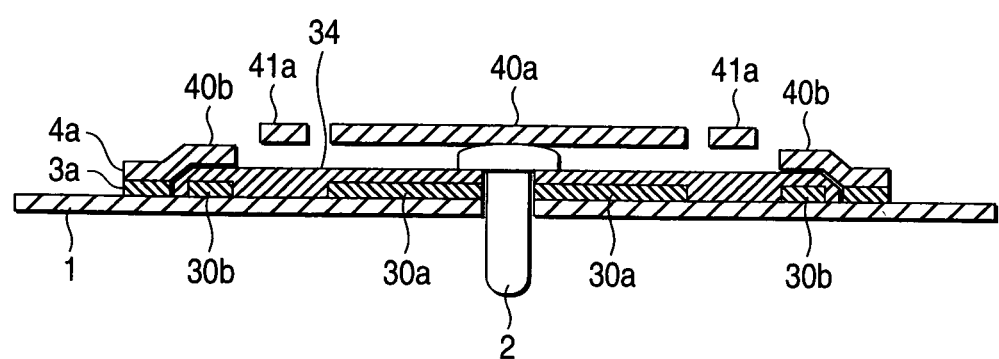
FIG. 7 is a view showing the operating principles of a fixing electrode and a movable electrode in a second embodiment mode of the present invention.

FIG. 7 shows the construction of a thickness detecting sensor in this second embodiment mode. A fixing electrode plate 3*a*, a movable electrode plate 4*a*, etc. are schematically shown in this FIG. 7. Reference numerals 30*a*, 30*b* designate two fixing electrodes respectively independently arranged on a printed board. Reference numeral 34 designates a resist arranged on these fixing electrodes 30*a*, 30*b*. Reference numeral 40*a* designates a movable electrode of the movable electrode plate 4*a*. Reference numeral 40*b* designates a fixing electrode of the movable electrode plate 4*a*. Reference numeral 41*a* designates a spring portion arranged in the outer circumferential portion of the movable electrode 40*a*. The fixing electrode 30*a* of the fixing electrode plate 3*a* side and the movable electrode 40*a* of the movable electrode plate 4*a* side are oppositely arranged, and the gap is enlarged by pressing the plunger 2. Independently of this structure, the fixing electrode 30*b* of the fixing electrode plate 3*a* side and the fixing electrode 40*b* of the movable electrode plate 4*a* side are oppositely arranged and are connected to the converting circuit shown by the broken line of FIG. 8 through respective unillustrated terminals.

Figure 8:
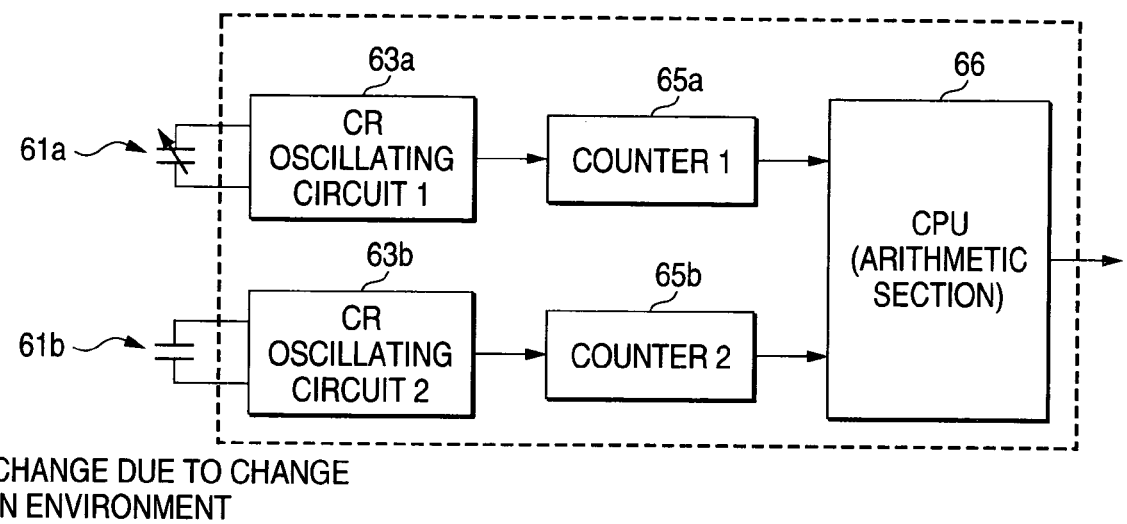
FIG. 8 is a circuit constructional view used in the second embodiment mode of the present invention.

In FIG. 8, reference numeral 61*a* designates a variable capacitor constructed by the fixing electrode 30*a* of the fixing electrode plate 3*a* side and the movable electrode 40*a* of the movable electrode plate 4*a* side. Reference numeral 61*b* designates a capacitor constructed by the fixing electrode 30*b* of the fixing electrode plate 3*a* side and the fixing electrode 40*b* of the movable electrode plate 4*a* side. The electrostatic capacity stored onto the capacitor 61*a* side is changed by the pressed pressure of the plunger 2 based on the thickness of a medium and a change in environment. Further, the electrostatic capacity stored onto the capacitor 61*b* side is changed by only the change in environment. These electrostatic capacities are converted into frequency signals by CR oscillating circuits 63*a*, 63*b* and are outputted to counters 65*a*, 65*b* and their respective output values are differentiated by a CPU 66.

In accordance with such a construction, it is possible to cancel the change in the electrostatic capacity due to a change in temperature, etc. and detect the exact thickness not depending on the change in temperature, etc.

Further, a structure for canceling the expansion of a member based on the temperature change may be constructed as follows.

Figure 9:
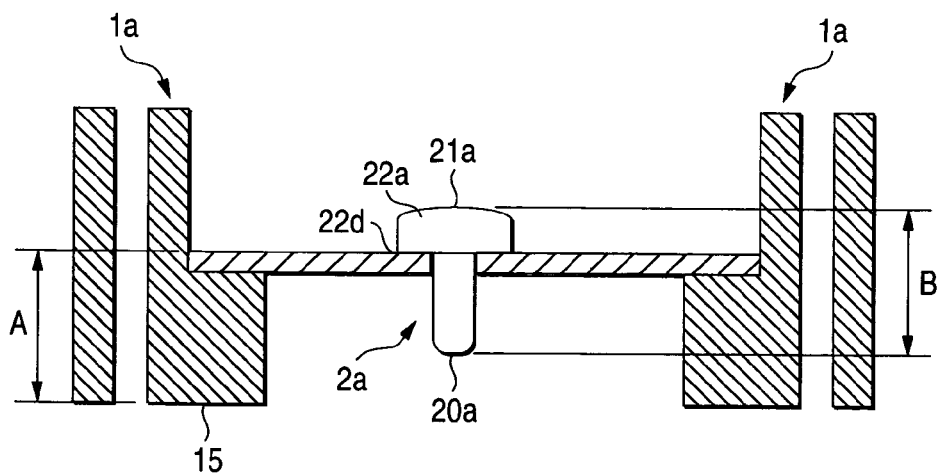
FIG. 9 is a principle view showing the constructions of a case and a plunger in a third embodiment mode of the present invention.

FIG. 9 shows the construction of the thickness detecting sensor in this third embodiment mode. FIG. 9 shows the principle view of the thickness detecting sensor constructed so as not to cause a change in the gap on the basis of expansion of the member even when the member is expanded on the basis of the temperature change. In FIG. 9, reference numerals 1*a* and 2*a* respectively designate a case and a plunger. The other constructions are similar to those in the first or second embodiment mode. In this third embodiment mode, the plunger 2*a* and the case 1*a* are constructed by members having the same coefficient of linear expansion. When the distance from the lower face 22*d* of a head portion 22*a* in the plunger 2*a* to the lower end face 15 of the case 1*a* is set to A and the distance from the rear end portion 21*a* of the plunger 2*a* to the tip portion 20*a* is set to B, the thickness detecting sensor is constructed so as to form "A=B". In accordance with such a construction, the distances have the same length and the plunger 2*a* and the case 1*a* have the same coefficient of linear expansion. Therefore, no distance between the lower end face 15 of the case 1 and the tip portion 20*a* of the plunger 2 is changed even when the temperature change is caused. Thus, it is possible to cancel the expansion of the member based on the temperature change.

Further, in the first embodiment mode, the plunger insertion hole 31 is arranged in the central portion of the fixing electrode 30, and the movable electrode 40 is pressed by the rear end portion 22 of the plunger 2 from the electrode face of the gap side. However, the thickness detecting sensor can be also constructed such that the plunger is connected to the outer circumferential portion of the movable electrode by passing through the outside of the fixing electrode plate and the movable electrode is raised from the upper side without arranging the plunger insertion hole 31 in this way.

Further, in the above embodiment mode, one electrode is set to the fixing electrode and the other electrode is set to the movable electrode. However, each of the electrodes can be also movably constructed if the thickness detecting sensor is constructed such that the gap is enlarged by making the electrode come in contact with the medium.

The thickness detecting sensor has a pair of electrodes arranged so as to be opposed to each other, a plunger for changing the gap between the electrodes by coming in contact with a medium, and a converting circuit for converting electrostatic capacity stored between the electrodes into an electric signal. In the thickness detecting sensor, the gap between the above electrodes is enlarged by displacement of the plunger corresponding to an increase in the thickness of the medium. Accordingly, the opposed electrodes in the initial state can be arranged so as to come in close contact with each other. Thus, frequency can be exactly detected within an area for linearly changing this frequency even when the gap between the electrodes is enlarged correspondingly to the increase in the thickness of the medium. Further, no dynamic range is determined by the gap in the initial state, and the dynamic range can be widely secured.

What is claimed is:

1. A thickness detecting sensor, comprising:
   a pair of electrodes comprising a first electrode and a second electrode,
       wherein the first electrode comprises a plunger insertion hole,
       wherein the second electrode is movable, and
       wherein the first electrode is fixed and interposed between an external medium and the second electrode;
   a plunger oriented to move through the plunger insertion hole, comprising a tip portion and a rear end portion,
       wherein the rear end portion is in contact with the second electrode, and
       wherein the tip portion is in contact with the external medium; and
   a converting circuit for converting electrostatic capacity stored between the pair of electrodes into an electric signal,
   wherein an increase in the thickness of the external medium displaces the plunger in a direction that changes a gap between the first electrode and the second electrode by moving the second electrode away from the first electrode.

2. The thickness detecting sensor of claim 1, further comprising:
   a spring portion for displacing the second electrode to change the gap between the first electrode and the second electrode.

3. The thickness detecting sensor according to claim 2, wherein the first electrode of said pair of electrodes is made by a printed board.

4. The thickness detecting sensor according to claim 3, wherein a resist is arranged on the first electrode made by said printed board, and the gap between the electrodes is formed by the resist.

5. The thickness detecting sensor according to claim 2, wherein a head portion having a diameter larger than that of the tip portion of the plunger is arranged in the rear end portion of the plunger.

6. The thickness detecting sensor according to claim 2, wherein the tip portion and the rear end portion of said plunger are constructed in the shape of a spherical surface.

7. The thickness detecting sensor according to claim 2, wherein a case for holding the plunger so as to be advanced and retreated is further arranged, and the case and the plunger are formed from the same material, and the distance from a plunger placing face to a lower end face in the case and the length of the plunger are the same.

8. The thickness detecting sensor according to claim 2, wherein the first electrode is fixed relative to a medium conveying path.

9. The thickness detecting sensor according to claim 2, wherein the plunger advances and retreats in an axial direction by coming in contact with the external medium.

10. The thickness detecting sensor according to claim 1, wherein the first electrode of said pair of electrodes is made by a printed board.

11. The thickness detecting sensor according to claim 10, wherein a resist is arranged on the first electrode made by said printed board, and the gap between the electrodes is formed by the resist.

12. The thickness detecting sensor according to claim 1, wherein a head portion having a diameter larger than that of the tip portion of the plunger is arranged in the rear end portion of the plunger.

13. The thickness detecting sensor according to claim 1, wherein the tip portion and the rear end portion of said plunger are constructed in the shape of a spherical surface.

14. The thickness detecting sensor according to claim 1, wherein a case for holding the plunger so as to be advanced and retreated is further arranged, and the case and the plunger are formed from the same material, and the distance from a plunger placing face to a lower end face in the case and the length of the plunger are the same.

15. The thickness detecting sensor according to claim 1, wherein the first electrode is fixed relative to a medium conveying path.

16. The thickness detecting sensor according to claim 1, wherein the plunger advances and retreats in an axial direction by coming in contact with the external medium.

* * * * *